Figure 1:
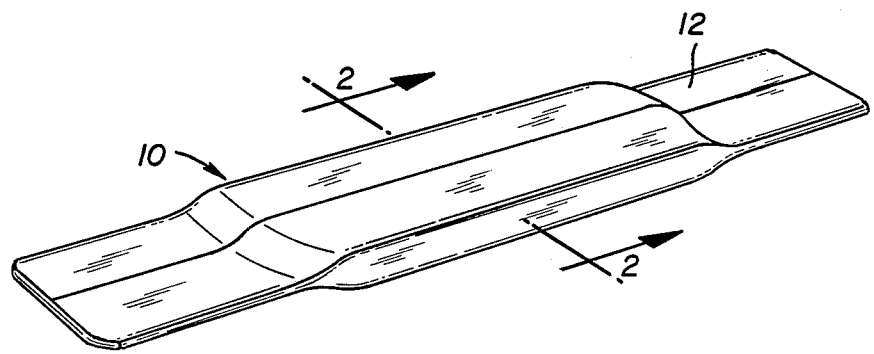

United States Patent [19]

Marcus et al.

[11] Patent Number: 4,826,497
[45] Date of Patent: May 2, 1989

[54] FIBROUS ABSORBENT ARTICLES HAVING ENHANCED DEODORIZING PROPERTIES

[75] Inventors: Bonita K. Marcus, Rye, N.Y.; Anthony J. Gioffre, Ridgefield, Conn.

[73] Assignee: UOP, Des Plains, Ill.

[21] Appl. No.: 128,649

[22] Filed: Dec. 4, 1987

Related U.S. Application Data

[63] Continuation-in-part of Ser. No. 67,977, Jun. 30, 1987, Pat. No. 4,795,482.

[51] Int. Cl.$^4$ ............................................. A61F 13/16
[52] U.S. Cl. ..................................... 604/359; 55/75; 55/389
[58] Field of Search .................... 604/359, 360; 55/68, 55/75, 382; 423/335, 339, 245

[56] References Cited

U.S. PATENT DOCUMENTS

| | | | |
|---|---|---|---|
| 3,683,592 | 8/1972 | Kamm et al. | 55/389 |
| 3,698,157 | 10/1972 | Allen et al. | 55/75 |
| 3,724,170 | 4/1973 | Allen et al. | 55/75 |
| 3,732,326 | 5/1973 | Chen | 55/75 |
| 3,789,797 | 2/1974 | Brewer | 119/1 |
| 3,960,520 | 6/1976 | Allen | 55/75 |
| 4,019,879 | 4/1977 | Rabo et al. | 55/75 |
| 4,019,880 | 4/1977 | Rabo et al. | 55/75 |
| 4,061,724 | 12/1977 | Grose et al. | 423/335 |
| 4,073,865 | 2/1978 | Flanigan et al. | 423/335 |
| 4,090,981 | 5/1978 | Rodewald | 55/75 |
| 4,257,885 | 3/1981 | Grose et al. | 55/75 |
| 4,309,281 | 1/1982 | Dessau | 55/75 |
| 4,331,694 | 5/1982 | Izod | 423/328 |
| 4,349,927 | 8/1982 | Young | 423/335 |
| 4,525,410 | 6/1985 | Hagiwara | 604/360 |
| 4,534,775 | 8/1985 | Fraizer | 55/75 |
| 4,604,110 | 8/1986 | Fraizer | 55/389 |
| 4,636,373 | 1/1987 | Rubin | 423/339 |
| 4,648,977 | 3/1987 | Garg et al. | 210/121 |
| 4,748,978 | 6/1988 | Kamp | 604/359 |
| 4,795,482 | 1/1989 | Gioffre et al. | 55/75 |

*Primary Examiner*—C. Fred Rosenbaum
*Assistant Examiner*—Mark O. Polutta
*Attorney, Agent, or Firm*—Richard G. Miller

[57] ABSTRACT

Fibrous absorbent articles such as disposable diapers, catamenial devices, wound dressings, bandages, incontinence pads, wipes, underwear, shoe inserts and the like, contain an effective amount of crystalline, siliceous molecular sieve having pore diameters of at least about 5.5 Angstroms and a relatively low capacity for adsorbed water, and exhibit enhanced deodorizing properties with respect to the body fluids intended to be absorbed.

20 Claims, 1 Drawing Sheet

FIBROUS ABSORBENT ARTICLES HAVING ENHANCED DEODORIZING PROPERTIES

This is a continuation-in part of U.S. patent application Ser. No. 67,977, filed June 30, 1987, now U.S. Pat. No. 4,795,482 herein incorporated by reference.

This invention relates to fibrous absorbent articles intended for the absorption of body fluids, such as disposable diapers, catamenial devices (e.g., tampons and sanitary napkins), wound dressings, bandages, incontinence pads, wipes, disposable underwear, shoe inserts and the like, that have deodorizing properties. In particular, the fibrous absorbent articles comprise crystalline siliceous molecular sieve component to provide enhanced removal of odors.

Fibrous absorbent articles have been known for some time and incorporate a plurality of fibers arranged in a structure to absorb and retain body fluids. The body fluids retained in these absorbent articles can emit unpleasant odors.

Odors from body fluids may be produced by a wide variety of chemical compounds that either are produced in the body and passed from the body such as excrement, catamenial fluids and sweat or seepage from wounds, and/or the odors may originate from microbial action on such body fluids. The odors may be produced by ammonia and ammonium compounds, amines, lower carboxylic acids or esters such as isovaleric acid, aldehydes, sulfur compounds, and the like. The threshold concentration of many of these odor-producing compounds for olfactory sensing by humans is relatively low, e.g., often less than parts per million by volume in air. For instance, ammonia can generally be detected at less than 40 parts by volume per billion; hydrogen sulfide, about 1 part per billion and isovaleric acid, less than about 100 parts per billion.

Heretofore, various proposals have been made to mitigate these odors such as the use of perfumes to mask the odors that may emanate from the absorbent article. Other proposals include the use of substances to remove the odor-causing compounds.

The odor-causing compounds may be removed by several mechanisms. For example, the odoriferous substance can be chemically reacted to form a non odoriferous and/or non volatile compound by chemical reaction or sorbed into a non-volatile substance, e.g., a solid or liquid. For a sorbent to be effective for deodorizing, especially for odors from body fluids that are characterized as having very low olfactory thresholds, it is essential that the sorbent be capable of removing, in its environment, virtually all the odoriferous compounds regardless of the concentration of the compound. Thus, the sorbent must be able to sorb an odoriferous compound when it is present in even trace amounts and the sorbent must be able to retain the sorbed odoriferous compound even when it approaches saturation.

The use of solid adsorbents to deodorize fibrous absorbent articles intended for absorption of body fluids has been proposed. By far the most commonly suggested solid adsorbent for odor suppression is activated charcoal or active carbon, although silica gel, activated alumina, kieselguhr, fullers earth and other clay minerals and zeolites, alone or in combination, have also been proposed as odor "adsorbents".

Japanese patent application publication No. 70200, dated June 10, 1977, discloses fibrous articles such as paper and loose fibers. The fibrous article is first heat treated, e.g., at 100° to 450° C. from 1 to 100 minutes and then treated with a zeolite (which has been treated with water repellant), synthetic zeolite, active charcoal or calcium-type bentonite.

Japanese patent application publication No. 138452, dated Aug. 17, 1983, discloses a sanitary towel containing an absorbent fabric having on its outer surface a zeolite and ascorbic acid compound such as the sodium or potassium salts of ascorbic acid or arabo ascorbic acid, or acyl derivatives of ascorbic acid or arabo ascorbic acid. The zeolite is preferably zeolite X or Y having large pores.

Another type of sanitary towel is disclosed in Japanese published patent application No. 31425 dated Mar. 30, 1981, in which a deodorizing agent is coated with a water-absorbing polymer. The deodorizing agent is magnesium silicate, aluminum silicate, calcium silicate, silica gel, chlorella powder, chlorophyll powder, ion exchanging resin powder, active carbon or zeolite.

A diaper containing molecular sieves is disclosed in European Patent Application No. 41569, dated Dec. 16, 1981. The diaper is constructed to provide a fabric layer on the side worn next to the skin of the user and a fabric layer incorporating a zeolite on the opposite side. The zeolite is stated to be a material capable of preferentially incorporating ammonium ions such as zeolite F, W or A, synthetic gismondine type zeolite, synthetic or natural mordenite, chabazite, phillipsite or clinoptilolite.

Japanese published patent application No. 268253, dated Nov. 27, 1986, discloses hygenic products in which a holmite series mineral is dispersed or impregnated into a natural or synthetic fiber from which the hygenic product is manufactured. The patent discloses that the water adsorption ratio of holmite (e.g., sepiolite) is about four times that of natural zeolite and that the product made using the holmite can adsorb and deodorize sweat, excretion and odor produced by the body. The hygenic product can be used for diapers, sanitary napkins, tampons, towels and underwear.

Japanese patent application publication No. 95042, dated May 31, 1984, discloses a biaxially stretched sheet of polymer containing 20 to 70 weight percent of a deodorizing powder such as activated carbon, zeolite, diatomaceous earth, as clay. The stretched sheet has fine holes, e.g., 0.1 to 5 microns. The sheet may be packed with absorbent to provide sanitary towels or sanitary napkins having good liquid absorption, liquid leak resistance, deodorizing properties and air permeability.

Japanese published patent application No. 141857, dated Nov. 5, 1979, discloses the lamination of two sheets of material to fix between the sheets a deodorizing powder such as active carbon, zeolite, ion exchange resin, carboxy methylcellulose, or polyethylene glycol.

Zeolites and molecular sieves have been incorporated into fibrous products for reasons other than deodorizing. For example, Japanese published patent application No. 138658, dated June 26, 1986, discloses the use of water impermeable, urethane films for sanitary briefs or diaper covers wherein the film contains antibacterial metal ions which are ion-exchanged into zeolites. The zeolites have specific surface areas greater than 150 square meters per gram and a silica to alumina ratio below 14. The antibacterial ions may be silver, copper or zinc. Similarly, U.S. Pat. No. 4,525,410, issued June 25, 1985, discloses fiber articles in which at least a portion of the fibers are stuck together at their intersections and zeolite particles are incorporated and retained in the structure. The zeolite is required to have a specific surface area of at least 150 square meters per gram and a silica to alumina ratio less than 14, preferably, less than 11. The zeolite is ion-exchanged with silver, copper or zinc.

Molecular sieves have been proposed for other odor control applications. For instance, in U.S. Pat. 4,437,429, the use of a hydrated zeolite in admixture with clay is proposed as being particularly useful for the control of odors from pet litter, it being observed that the use of zeolites by themselves as litter material has generally been unsuccessful due to their poor water adsorption properties as compared with clays. For the adsorption of certain odors from animal litter using a mixture of clays and zeolites, it is proposed in U.S. Pat. No. 4,437,429 that the zeolite constituent not only be employed in its hydrated state, but also that the water of hydration be the original water of hydration. It is said to be not sufficient that water is added to a previously heat-treated zeolite from which the original water of hydration was driven off.

In general, when zeolites have been utilized for odor suppression, the preferred species have been those with a low framework Si/Al ratio and a high degree of adsorption capacity for water or other highly polar molecules such as ammonia or hydrogen sulfide. The disclosure of the aforesaid U.S. Pat. No. 4,437,429 is somewhat remarkable for its specific disclosure of many of the class of so-called high silica zeolites which are synthesized using organic templating agents such as the tetraalkylammonium ions. These include ZSM-5, ZSM-11, ZSM-12 and ZSM-23. The preferred zeolite species is the natural mineral clinoptilolite, however, which has a nominal framework $SiO_2/Al_2O_3$ molar ratio of about ten. U.S. Pat. No. 4,648,977 discloses using high-silica molecular sieves, including the silica polymorph silicalite, to adsorb toxic organic materials, including mercaptans, from aqueous media for water purification purposes.

SUMMARY OF THE INVENTION

In accordance with this invention, fibrous absorbent articles for absorbing body fluids are provided which contain an effective amount of molecular sieve to reduce the emanation of odors from the fibrous absorbent article, said molecular sieve comprising a crystalline siliceous molecular sieve in which at least about 90 percent of the framework tetrahedral oxide units are $SiO_2$ tetrahedra, which has pore diameters of at least 5.5 Angstroms and has a capacity for adsorbed water not greater than 10 weight percent under standard conditions as described herein.

The fibrous absorbent articles of this invention essentially eliminate characteristic odors from various body fluids. Hence the fibrous absorbent articles are particularly attractive for use in disposable diapers, catamenial devices, wound dressings, bandages, incontinence pads, sanitary towels, disposable underwear, shoe inserts, wipes and the like.

CRYSTALLINE SILICEOUS MOLECULAR SIEVES

The fibrous absorbent articles of this invention contain crystalline siliceous molecular sieve. The crystalline siliceous molecular sieve has at least about 90, and preferably at least about 95, percent of the framework tetrahedral oxide units being $SiO_2$ tetrahedra and have a sorptive capacity for water of less than 10 weight percent under standard conditions. The water adsorption capacity of molecular sieves is generally measured based on a defined temperature, vapor pressure and time. For the purposes herein, a "Standard Condition" will be referred to when describing water adsorption capacity which conditions shall be 25° C., a water vapor pressure of 4.6 torr and a time of two hours.

In the case of aluminosilicate molecular sieves, those most often used in the practice of the invention have a framework $SiO_2/Al_2O_3$ molar ratio of from at least about 18, say, about 35 to infinity, and preferably from 200 to 500. All of the siliceous molecular sieves suitably employed have pore diameters of at least 5.5 Angstroms, preferably at least 6.2 Angstroms. Preferably the adsorption capacity for water vapor is less than 6 weight percent at Standard Conditions.

The efficacy of the molecular sieves employed in the practice of the present invention is not dependent upon the presence of the water of hydration present in the internal cavities of the microporous structure as a result of their hydrothermal formation. In fact, at least a major proportion, usually substantially all, of this original water of hydration is often removed in the process of removing any pore-blocking templating agent which may be present in the as-synthesized form of the molecular sieve. Calcination effectively removes the organic moieties. Also, water washing or washing with a caustic or dilute mineral acid solution is advantageously utilized to remove extraneous inorganic synthesis reagents from the pore system. Lowering of the alkali metal content, particularly the non zeolitic, i.e., occluded alkali metal compounds, can also be beneficial. These procedures also serve to remove the original water of hydration.

The siliceous molecular sieves suitably employed in the practice of the invention include the microporous crystalline aluminosilicates, i.e. the zeolitic molecular sieves as well as the so-called silica polymorphs. With respect to the latter compositions, their crystal lattices are ideally formed entirely of $SiO_2$ tetrahedral units, but the as-synthesized forms commonly contain at least trace amounts of aluminum derived from aluminum impurities in the synthesis reagents. The aluminosilicate molecular sieves comprise the large class of well-known crystalline zeolites. These high-silica molecular sieves are either commercially available or are prepared by methods, well-known in the art, involving direct hydrothermal synthesis or involving certain types of crystal lattice dealuminations. A comprehensive review article by E. M. Flanigen concerning both "high" Si/Al zeolites and silica molecular sieves is published in "Proc. 5th Int. Conf. Zeolites, Naples, 1980", L. V. C. Rees, ed., Heyden, London, pp. 760–780. This article is incorporated herein by reference.

It is a critical aspect of the present invention that the adsorptive capacity for water of the siliceous molecular sieve is less than 10 weight percent under Standard Conditions. It is another critical aspect that the number of $AlO_2^-$ tetrahedral units of the crystal lattice, if present at all, be very small compared with the number of $SiO_2$ tetrahedral units. It has been observed that there appears to be some correlation between the framework $SiO_2/Al_2O_3$ ratio and the adsorptive capacity for water, i.e., the so-called hydrophobicity, of siliceous molecular sieves. It has also been observed, however, that in certain instances, for example in the case of zeolite Beta, a molecular sieve having a highly siliceous crystal framework may not be sufficiently hydrophobic or possess the desired sorptivity. Thus, while many molecular sieves with framework $SiO_2/Al_2O_3$ molar ratios of greater than about 18, and especially greater than about 35, exhibit the requisite degree of hydrophobicity for use in the present invention, some do not. It may also be advantageous, in some instances, to have the alkali metal content of the molecular sieve low, i.e., not greater than 0.2 wt. %, anhydrous basis.

Whatever the reason, it is found that the class of medium to large pore siliceous molecular sieves defined hereinabove, preferably in the form in which the original, as-synthesized water of hydration has been substantially removed, function in an extraordinary manner with respect to odor elimination from body fluids. Many of the synthetic zeolites prepared using organic templating agents are readily prepared in a highly siliceous form—some even from reaction mixtures which have no intentionally added aluminum. These zeolites are markedly organophilic and include ZSM-5 (U.S. Pat. No. 3,702,886); ZSM-11 (U.S. Pat. No. 3,709,979); ZSM-35 (U.S. Pat. No. 4,016,245); ZSM-23 (U.S. Pat. No. 4,076,842); and ZSM-38 (U.S. Pat. No. 4,046,859) to name only a few. It has been found that the silica molecular sieves known as silicalite and F-silicalite are particularly suitable for use in the present invention and are thus preferred. These materials are disclosed in U.S. Pat. Nos. 4,061,724 and 4,073,865, respectively. To the extent the aforesaid siliceous sieves are synthesized to have $SiO_2Al_2O_3$ ratios greater than 35, they are frequently suitable for use in the present process without any additional treatment to increase their degree of hydrophobicity. Molecular sieves which cannot be directly synthesized to have both sufficiently high Si/Al and/or degree of hydrophobicity ratios can be subjected to dealumination techniques, fluorine treatments and the like, which result in organophilic zeolite products. High temperature steaming procedures for treating zeolite Y which result in hydrophobic product forms are reported by P. K. Maher et al., "Molecular Sieve Zeolites," Advan. Chem. Ser. 101, American Chemical Society, Washington, D.C., 1971, p. 266. A more recently reported procedure applicable to zeolite species generally involves dealumination and the substitution of silicon into the dealuminated lattice site. This process is disclosed in U.S. Pat. No. 4,503,023 issued Mar. 5, 1985 to Skeels, et al. Halogen or halide compound treatments for zeolites to increase their hydrophobicity are disclosed in U.S. Pat. Nos. 4,569,833 and 4,297,335.

With respect to the foregoing adsorbents, it is important that the pore system be open so that the internal cavities of the crystals be accessible to the odor molecules. In the case of the aluminosilicates or silica polymorphs produced using large organic templating ions such as tetraalkylammonium ions, it is necessary to remove charge balancing organic ions and any occluded templating material in order to permit adsorption of the odor molecules. In such a removal process and also in the removal of inorganic debris, the original water of hydration is also removed. Upon exposure to the atmosphere a portion of the water of hydration is reacquired, but this does not affect the general performance of the molecular sieve, i.e., the molecular sieve can be employed in either a hydrated or dehydrated state, but in general the dehydrated state is preferred. In the case of most of the dealumination procedures referred to above, the original water of dehydration is also removed, and can similarly be replaced, if desired.

It should be pointed out that it is the framework $SiO_2/Al_2O_3$ ratio which is important. This is not necessarily the same ratio as would be indicated by conventional wet chemical analysis. Especially is this the case when dealumination has been accomplished by high temperature steaming treatments wherein aluminum-containing tetrahedral units of the zeolite are destroyed, but the aluminum values remain, at least in part, in the zeolite crystals. For such zeolite products resort must be had to other analytical methods such as X-ray and NMR. One such steam-treated zeolite Y composition, denominated LZ-10, has been found to be particularly useful in the practice of the present process, especially when utilized in combination with the silica polymorph silicalite. The process for preparing LZ-10 is described in detail in U.S. Pat. No. 4,331,694 and in U.S. patent application Ser. No. 880,561 filed Feb. 23, 1978, herein incorporated by reference. A benefit appears to be obtained by such a combination of molecular sieves in all proportions, but each type of adsorbent is preferably present in an amount of at least 10 percent based on the total weight of the two adsorbents (hydrated weight basis).

The crystalline siliceous molecular sieve may be in any suitable form. Typically, the molecular sieve is in its powder form or may be aggregated into larger particles, e.g., about 0.5 to 500 or more microns in major dimension. The aggregates may be any convenient shape, e.g., spheres, cylinders, free form, or the like. Binders such as silica or alumina binders may be used in forming aggregates. The aggregates may contain other desirable components for the fibrous absorbent article as herein later discussed.

FIBROUS ABSORBENT ARTICLES

The fibrous absorbent article comprises fibrous material capable of absorbing body fluids such as catamenial fluids, urine, sweat, seepage from wounds and the like. Various fibrous materials that have been proposed as absorbents include wood fluff, cellulosic derivatives (rayon), cotton, synthetic polymer and synthetic polymer blends (e.g., polyester, polypropylene, nylon, polyethylene, and the like).

The fibrous material may be arranged to form a woven or non-woven structure which may be in the form of a batt or a web or a tissue or fabric or an open pore foam. These structures can be formed by any convenient technique and include dry and wet techniques.

The fibrous absorbent article may essentially be a unicomponent article or may be a multicomponent article. The specific arrangement will often be chosen depending upon the application and the other components of the fibrous absorbent. Exemplary of unicomponent articles are those in which the fibrous material essentially constitutes the article such as paper towels, non-woven fabric in the form of underwear, shoe inserts and the like in which the siliceous molecular sieve is incorporated into the fibrous structure. Multicomponent articles may employ layers or areas of different or the same materials. For example, a sanitary napkin may consist of a plurality of fibrous absorption fabrics or a wipe may have a plurality of fibrous absorption tissues. Dissimilar components in the fibrous absorption article may perform different functions. Thus, a fibrous batt may be positioned between an essentially water impermeable exterior sheet and a permeable, but non-absorptive body contact sheet in the construction of a diaper, bandage or sanitary napkin. Also, a structural web of a stronger, but, perhaps, substantially non-absorptive, material may be used to provide a frame for attaching the fibrous material and the structural web can provide significant strength to the resulting fibrous absorbent article.

Other components which may be contained in a fibrous absorbent article include superabsorbent materials in the case of catamenial devices incontinence pads, towels and diapers. Superabsorbents are capable of absorbing large amounts of water, e.g., often up to ten times or more its dry weight. Superabsorbents are typically water swellable polymers such as polysaccharides, modified and regenerated polysaccharides, grafted polysaccharides, polyacrylates, polyacrylonitriles (especially polyacrylonitriles grafted onto polyvinyl alcohol), polyvinyl alcohol, hydrophyllic polyurethanes, partially hydrolyzed polyacrylamides, sulfonated polystyrene, sulfonated polyethers, poly(alkylene oxide), and the like. The superabsorbents may be provided in any convenient form such as fibers, spheres, bits of film, or coatings on other components in the fibrous absorbent.

Other components that may be present include medicants, other absorbents and adsorbents (including sodium bicarbonate, activated carbon, clays, silica gel, and other molecular sieves having high water sorptivity and/or ammonium ion sorptivity such as zeolites X, Y, W, A, clinoptilolite; mordenite, etc.), and the like. Fragrances may be employed, but consideration must be given to the sorptivity of the siliceous molecular sieve. In general, larger molecular size fragrances are preferred.

The amount of the crystalline siliceous molecular sieve employed in the fibrous absorbent articles should be sufficient to significantly reduce, if not essentially eliminate, the odors from the body fluid intended to be absorbed during use. Thus, depending upon the use of the fibrous absorbent, the amount of crystalline siliceous molecular sieve desired for incorporation may vary. In applications such as diapers where substantial odoriferous fluid may need to be retained, larger amounts may be desired than in applications such as bandages. The siliceous molecular sieves employed in the fibrous absorbent article of this invention are characterized as being very effective when used in relatively small amounts. In part this is due to the adsorption activity of these molecular sieves and in part, due to the selectivity of the siliceous molecular sieves toward the odor-causing compounds emanating from body fluids. For example, as little as 0.1 gram of siliceous molecular sieve has been found to effectively remove odors from catamenial devices.

The amounts of siliceous molecular sieve used in a fibrous absorption article may be characterized by various means, i.e., on a per article basis, on a volume basis, on an effective area basis, etc. Because of the wide variety of materials, construction and shape of fibrous absorbent articles and of the fibrous structures, difficulty exists in establishing a sound comparative basis for describing silieous molecular sieve content. In general, however, the siliceous molecular sieve content may be described in terms of grams per unit volume of the fibrous structure in its uncompressed, dry state or grams per unit effective area (i.e., the area of the major plane of the fibrous structure). Generally the amount of crystalline siliceous molecular sieve is at least about 0.001 and sometimes up to about 50, preferably, 0.01 to 25 grams per 100 cubic centimeters of fibrous material volume. Often, the amount of crystalline siliceous molecular sieve is between about 0.05 to 10 grams per 100 cubic centimeters of volume. Typically, the siliceous molecular sieve is provided in an amount of about 0.01 to 25 grams, e.g., about 0.05 to 10, grams per 100 square centimeters of effective area. For various applications, e.g., catamenial devices, the crystalline siliceous molecular sieve is usually used in an amount of about 0.01 to 10 grams per pad or tampon; for diapers, about 0.05 to 50 grams per diaper; for shoe pads, about 0.05 to 10 grams per pad.

The crystalline siliceous molecular sieve may be incorporated into the fibrous absorbent in any suitable manner. For instance, it can be loosely dispersed within a batt or tissue containing fibrous material. Generally, however, it is preferred that the molecular sieve be sufficiently immobilized in the fibrous absorbent that it does not readily migrate to the body. The molecular sieve may be, for example, retained within the fibrous absorbent in a fluid permeable container through which the molecular sieve cannot pass. Thus, molecular sieve may be positioned between two sheets of permeable thermoplastic which have been heat sealed. The sheets may be perforated with small holes to achieve the desired permeability. A particularly attractive means for securing the siliceous molecular sieve in a fibrous absorbent article is to place the molecular sieve between two layers of tissue or fabric that is absorbent and then adhere the layers together, e.g., mechanically by needle punching or securing; by gluing, e.g., with latex; or by heat sealing. The molecular sieve-containing composite can be readily handled including cut and shaped and incorporated into the fibrous absorbent article.

Another means for providing the molecular sieve includes using the molecular sieve as a filler, e.g., in an amount of at least about 1, say, about 1 to 70, e.g., about 5 to 70, percent by weight, in a polymeric film or paper-type material which is intended to contain the fibrous material or be incorporated within the fibrous absorbent article. Alternatively, or in addition, the molecular sieve may similarly be incorporated into the fibrous material which is prepared from a polymeric melt and-/or any superabsorbent employed. Molecular sieve may also be incorporated by the use of an adhesive material on at least a portion of the fibrous absorbent article (e.g., linings, fibrous material, structural elements, etc.) or even by contacting the molecular sieve with thermoplastic material (e.g., linings, fibrous material, structural elements, etc.) while the thermoplastic material is at a sufficiently high temperature to be tacky. Drawings FIG. 1 depicts perspective view of a sanitary napkin; and FIG. 2 is a cross-sectional view of the sanitary napkin of FIG. 1 through lines 2—2.

Figure 2:
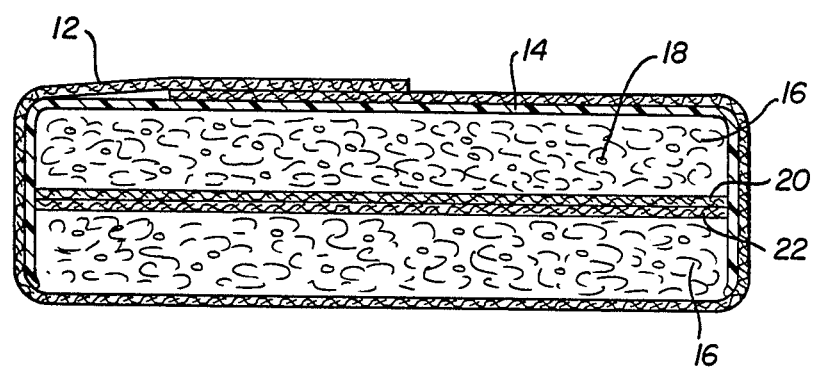

FIG. 1 illustrates a sanitary napkin 10 having a fabric overlay 12. FIG. 2 is a cross-sectional view showing the construction in the napkin 10. With reference to FIG. 2, the fabric overlay 12 is a moisture-permeable non-woven fabric and has immediately to its interior, a moisture-impermeable layer 14 which surrounds the sides and the bottom of the sanitary napkin. Within the volume defined by the fabric overlay 12 and the moisture-impermeable layer 14 is contained fibrous batts 16 which serve to absorb liquid. Particles of superabsorbent 18 are also depicted within batts 16. As shown, non-woven fabrics 20 and 22 form a sandwich structure and are shown intermediate batts 16 and are fluid permeable. In between fabrics 20 and 22 is dispersed siliceous molecular sieve. Fabrics 20 and 22 are secured together by latex. Alternatively, fabrics 20 and 22 may be positioned immediately adjacent the bottom or the top of the interior of the napkin 10.

EXAMPLES

The invention is illustrated by the examples appearing hereinafter. Body odors, e.g., for catamenial fluids, can contain lower carboxylic acids and amines. Examples 1 to 19 serve to illustrate the effectiveness of siliceous molecular sieves in removing isovaleric acid and triethylamine, odoriferous components which are typically present in catamenial fluids. For examples 1 to 20, a number of high silica aluminosilicates and silica polymorphs were exposed to various odorous substances in a reproducible and consistent manner to determine the absolute or relative amounts of odors adsorbed. In the experiments 40 ml. screwcap vials equipped with Teflon-lined silicone rubber septa were used. The vials were measured to have a capacity of 43.5±0.1 ml.

The activated charcoal adsorbent used was 70/80 mesh chromatographic grade from Analabs, Inc., Hamden, Conn., and was labeled ANASORB grade. The adsorbent of interest was weighed into the vial and the vial was capped. The adsorbate was added to the sealed vial with a Hamilton syringe. Samples were shaken by hand to mix the liquid/solid/vapor phases and the vapors in the headspace of the vials were analyzed by gas chromatography within 5 to 20 minutes after weighing and mixing.

To determine the maximum vapor concentrations of the volatile test compounds in air, the pure compounds were placed into 43.5 ml. capacity vials and stored for at least one hour prior to analysis. Generally 2 microliter aliquots from the headspace of the 43.5 ml. vials were analyzed; 2 microliters of room air was injected to maintain consistent atmospheric pressure.

Prior to and after each sample injection the syringe needle was placed into a 200° C. syringe cleaner under vacuum (estimated pressure less than $5 \times 10^{-3}$ torr). As a heat source a 100 watt light bulb was placed over the syringe at a distance of 1 to 2 inches. This was done to eliminate any cross contamination from vapor molecules adsorbed on the Teflon parts of the syringe. The heating under vacuum was done for approximately 5 minutes prior to use. Analysis of room air after this cleaning procedure showed no contamination in the syringe.

Gas chromatographic analytical techniques were employed to measure the concentration of odor components in the headspace of the sample vials. The column was a 0.32 mm. I.D.×30 meters, fused silica adsorbent capillary containing a 1 micron internal coating of polyethylene glycol as the adsorbent. A flame ionization detector was utilized to determine retention times. The oven conditions were 50° C. for four minutes and then raised to 150° C. at the rate of 10° C. per minute.

EXAMPLE 1

(a) Ten microliters of isovaleric acid were placed in an empty capped 43.5 ml. vial and the headspace vapors determined in accordance with the above described test procedures were found to exist in a concentration of 668 ppm. The retention time was 4.83 minutes with a small additional peak present at 4.22 minutes.

(b) To the vial containing the isovaleric acid used in part (a) above was added 0.5 grams of sodium bicarbonate. The concentration of isovaleric acid in the vial headspace was found to be reduced to a concentration of 2.2 ppm. The 4.22 peak observed in part (a) was still present, and in addition new peaks at 4.87, 6.36, 6.61 and 6.94 were produced.

(c) To the vial containing the isovaleric acid used in part (a) above was added 0.5 grams of an equal parts by weight mixture of activated silicalite and zeolite LZ-10. The concentration of isovaleric acid in the vial headspace was found to be reduced to less than the was chromatograph detector limit which was about 0.82 ppm. and in addition the peak at 4.22 was removed without the introduction of any new peaks.

EXAMPLES 2-9

Eight different adsorbent materials were tested for their ability to deodorize the airspace over triethylamine, a common constituent of various animal and human excretions. In carrying out the tests, 500 mg. of the adsorbent solid were placed in a 43.5 ml. vial and the triethylamine added in sufficient quantity to give a weight loading of triethylamine of 4.37%. For purposes of comparison, triethylamine was placed in a vial with no adsorbent. The headspace vapors in the vials were analyzed in the same manner as described hereinabove. The adsorbent identified as LZ-20 in Example 2, and in subsequent Examples, is a steam-stabilized form of zeolite Y prepared in a manner essentially the same as employed in the preparation of LZ-10 except the steaming conditions were less rigorous resulting in a product having a water adsorption capacity of about 10 weight percent at Standard Conditions, and a sodium content (as $Na_2O$) of 0.2 weight percent (anhydrous basis). The adsorbent identified as LZ105-5 in Example 9 and subsequent examples was a zeolite of the ZSM-5 type prepared in the absence of organic templating material to produce a zeolite having a $SiO_2/Al_2O_3$ molar ratio of about 36.7 and a $Na_2/Al_2$ ratio of 1.19. The adsorbent composition of Example 5 was equal parts by weight mixture of LZ-10 and silicalite. The analytical results are set forth below in tabular form.

TABLE I

| | Adsorbent | TEA in Headspace, ppm |
|---|---|---|
| | None | 470. |
| Ex. 2 | LZ-20 | .003 |
| Ex. 3 | LZ-10 | .010 |
| Ex. 4 | Activated Charcoal | .017 |
| Ex. 5 | LZ-10; Silicalite | .033 |
| Ex. 6 | Silica gel | 19.74 |
| Ex. 7 | Silicalite | <108. |
| Ex. 8 | NaHCO₃ | <108. |
| Ex. 9 | LZ-105-5 | <108. |

EXAMPLE 10

A combination of isovaleric acid and butyl mercaptan (butanethiol) was used in increasing amounts to determine the effects of various weight percent loading on a composition of equal parts by weight of LZ-10 and silicalite on the residual headspace concentration. The results are:

TABLE II

| Weight Percent Loading On Adsorbent | | Remaining (ppm) In Air After Treatment | |
|---|---|---|---|
| Isovaleric Acid | Butanethiol | Isovaleric Acid | Butanethiol |
| No adsorbent | | 1.58 | 206 |
| 0.93 | 0.83 | .0012 | .0011 |

TABLE II-continued

| Weight Percent Loading On Adsorbent | | Remaining (ppm) In Air After Treatment | |
|---|---|---|---|
| Isovaleric Acid | Butanethiol | Isovaleric Acid | Butanethiol |
| 1.86 | 1.67 | .0011 | .0011 |
| 2.79 | 2.65 | .0019 | .0097 |
| 3.71 | 3.33 | .0014 | .0136 |
| 7.43 | 6.67 | .0021 | .0762 |
| 9.29 | 8.34 | .0174 | 4.73 |

EXAMPLES 11–18

The same type of test as Examples 2–9 was conducted on a number of other materials. The results are:

TABLE III

| | Adsorbent | Headspace Composition; ppm | |
|---|---|---|---|
| | | Isovaleric Acid | Butanethiol |
| | None | 1.58 | 206 |
| Ex 11 | LZ-20 | .0104 | .2266 |
| Ex 12 | LZ-10 | .0038 | .5768 |
| Ex 13 | LZ-105-5 | .5846 | .0659 |
| Ex 14 | Silicalite | .3160 | 4.326 |
| Ex 15 | Silica Gel | .8216 | 6.386 |
| Ex 16 | Silicalite; LZ-10* | .0237 | .2060 |
| Ex 17 | LZ-105-5; LZ-20* | .0111 | .0659 |
| Ex 18 | Silicalite; LZ-20* | .0174 | .0082 |

*Equal parts by weight

EXAMPLE 19

The samples from Examples 11–18 were allowed to remain capped at room temperature and re-tested after twenty-four hours. The following results were obtained:

TABLE IV

| Adsorbent | Headspace Composition; ppm | |
|---|---|---|
| | Isovaleric Acid | Butanethiol |
| None | 1.58 | 206 |
| Silicalite | .0458 | .1133 |
| LZ-20 | .0190 | .7416 |
| LZ-10 | .0790 | 2.06 |
| LZ-105-5 | .4266 | 2.47 |
| Silicalite; LZ-10 | .5214 | 28.84 |

EXAMPLE 20

To establish that certain highly siliceous molecular sieves lacking the requisite degree of hydrophobicity do not qualify as adsorbents for use in this invention, a zeolite Beta having a framework $SiO_2/Al_2O_3$ molar ratio of 25.4 and a water sorption capacity of 14.28 weight percent at Standard Conditions, was contacted with isovaleric acid. It was found by a subjective "sniff" test that an appreciable amount of odor due to the isovaleric acid remained after contact with the adsorbent.

EXAMPLE 21

A commercially obtained sanitary napkin (STAY-FREE brand available from the Johnson & Johnson Company) was worn by a woman during menstruation. The napkin was removed and a marked odor was detected even though the sanitary napkin was perfumed. A mixture of equal parts by weight of activated silicalite and zeolite LZ-10 were sprinkled on the stained portion sufficient to cover that area and no odor was detected.

EXAMPLE 22

Two non woven sheets comprised of cellulose were assembled into a laminate sandwich containing a relatively uniform distribution of siliceous molecular sieves. Each sheet was about 1 millimeter in thickness and about 12 centimeters wide and 25 centimeters in length. The sheets were sealed together using polyester to form a single sheet about 2 millimeters in thickness. The sheet contained about 1 gram of a mixture of equal parts by weight of activated silicalite and zeolite LZ-10.

The sheet was folded double and placed under the top layer of a commercial sanitary napkin (STAY-FREE brand available from the Johnson & Johnson Company) and worn by a woman during menstruation. After use, the napkin had no detectable odor.

It is claimed:

1. A fibrous absorbent article for absorbing body fluids comprising a fibrous material defining a structure suitable for absorbing body fluids and an effective amount to reduce odors from the body fluids of crystalline siliceous molecular sieve in which at least about 90 percent of the framework tetrahedral oxide units are $SiO_2$ tetrahedra, having pore diameters of at least about 5.5 Angstroms and having a capacity for adsorbed water not greater than 10 weight percent when measured using a water vapor pressure of 4.6 torr at a temperature of 25° C. and for a time of two hours.

2. The fibrous absorbent article of claim 1 wherein the crystalline siliceous molecular sieve has at least been partially activated.

3. The fibrous absorbent article of claim 1 wherein the siliceous molecular sieve has a capacity for adsorbed water of not greater than 6 weight percent under Standard Conditions.

4. The fibrous absorbent article of claim 1 wherein the siliceous molecular sieve is an aluminosilicate having a framework $SiO_2/Al_2O_2$ molar ratio greater than 35.

5. The fibrous absorbent article of claim 4 wherein the aluminosilicate has a $SiO_2/Al_2O_3$ molar ratio of from 200 to 500.

6. The fibrous absorbent article of claim 1 wherein the siliceous molecular sieve comprises a silica polymorph.

7. The fibrous absorbent article of claim 1 wherein the siliceous molecular sieve comprises a mixture of a silica polymorph and an aluminosilicate having a framework $SiO_2/Al_2O_3$ ratio of from 200 to 500.

8. The fibrous absorbent article of claim 1 wherein the siliceous molecular sieve comprises a mixture of a silica polymorph and a type Y zeolite having a framework $SiO_2/Al_2O_3$ ratio of at least 35, said silica polymorph and said type Y zeolite each having a capacity for adsorbed water of not greater than 10 weight percent when measured at Standard Conditions.

9. The fibrous absorbent article of claim 8 wherein the silica polymorph comprises silicalite and the type Y zeolite is LZ-10.

10. The fibrous absorbent article of claim 1 wherein the crystalline siliceous molecular sieve contains less than 0.2 weight percent alkali metal on an anhydrous basis.

11. The fibrous absorbent article of claim 1 which comprises about 0.01 to 50 grams of said siliceous molecular sieve per 100 cubic centimeters of article volume.

12. The fibrous absorbent article of claim 1 which comprises about 0.01 to 25 grams of said siliceous molecular sieve per 100 cubic centimeters of effective area.

13. The fibrous absorbent article of claim 1 wherein the fibrous material structure is a non-woven batt.

14. The fibrous absorbent article of claim 1 wherein the siliceous molecular sieve is dispersed in the fibrous material.

15. The fibrous absorbent article of claim 1 wherein the siliceous molecular sieve is contained in a fluid permeable structure through which the siliceous molecular sieve cannot pass.

16. The fibrous absorbent article of claim 5 which is a catamenial article.

17. The fibrous absorbent article of claim 16 which is a sanitary napkin.

18. The fibrous absorbent article of claim 17 which contains about 0.01 to 10 grams of siliceous molecular sieve.

19. The fibrous absorbent article of claim 17 in which two siliceous molecular sieves are contained within a sandwich structure of two fluid permeable sheets which sheets are positioned within the sanitary napkin.

20. The fibrous absorbent article of claim 19 which contains superabsorber.

* * * * *